(12) United States Patent
Blomberg et al.

(10) Patent No.: US 6,722,625 B2
(45) Date of Patent: Apr. 20, 2004

(54) METHOD FOR CONTROLLING A VALVE ELEMENT AND VALVE ASSEMBLY

(75) Inventors: Urban Blomberg, Solna (SE); Fredrik Jalde, Bromma (SE)

(73) Assignee: Siemens Elema AB, Solna (SE)

( * ) Notice: Subject to any disclaimer, the term of this patent is extended or adjusted under 35 U.S.C. 154(b) by 0 days.

(21) Appl. No.: 10/351,805

(22) Filed: Jan. 27, 2003

(65) Prior Publication Data

US 2003/0151012 A1 Aug. 14, 2003

(30) Foreign Application Priority Data

Feb. 13, 2002 (SE) .............................................. 0200409

(51) Int. Cl.⁷ .............................................. F16K 31/02
(52) U.S. Cl. .............................. 251/129.04; 251/129.01
(58) Field of Search ........................ 251/129.01–129.22

(56) References Cited

U.S. PATENT DOCUMENTS

| | | | |
|---|---|---|---|
| 2,996,928 A | | 8/1961 | Watson |
| 4,947,893 A | * | 8/1990 | Miller .................... 251/129.15 |
| 5,265,594 A | | 11/1993 | Olsson et al. |
| 5,513,673 A | * | 5/1996 | Slavin et al. .......... 251/129.18 |
| 5,685,149 A | | 11/1997 | Schneider et al. |
| 5,787,924 A | | 8/1998 | Cewers et al. |
| 5,947,086 A | | 9/1999 | Hoshino et al. |
| 6,285,913 B1 | | 9/2001 | Hägglund |

* cited by examiner

*Primary Examiner*—Paul J. Hirsch
(74) *Attorney, Agent, or Firm*—Schiff Hardin LLP

(57) ABSTRACT

A valve assembly HAS an element movable in a mechanical journal arrangement relative to a valve opening to establish an opening position of a valve, and A control unit for controlling the application of an oscillatory electromagnetic force to the element (8) having an known peak amplitude to cause the element to execute a sympathetic oscillatory motion as a friction reducing maneuver. The control unit is adapted to control the peak amplitude of the oscillatory electromagnetic force to sequentially apply a number of different peak amplitudes, each during a different measurement period. A monitor detects changes in the opening position of the valve during each of the measurement periods and provides a measure thereof. A processor is connected to the control unit and to the monitor to determine a working amplitude of the oscillatory electromagnetic force at which the detected changes will be minimized and to supply the determined working amplitude to the control unit.

9 Claims, 2 Drawing Sheets

METHOD FOR CONTROLLING A VALVE ELEMENT AND VALVE ASSEMBLY

BACKGROUND OF THE INVENTION

1. Field of the Invention

The present invention relates to a method of controlling an oscillatory friction-reducing maneuver of a valve element journaled in a bearing for movement to regulate a degree of opening of the valve, and to a valve assembly having an element operable according to the method.

2. Description of the Prior Art

In valves for which the degree of opening is automatically regulated with a mechanically journaled element friction in the bearing can cause problems. One of the most common is that frictional forces cause the element to stick in a particular position so that a change in the force applied to the element in order to move it to another position can have unpredictable results. Moreover, the magnitude of the frictional force itself is often unpredictable, since it may change with the age of the valve, the pressure of the element against the bearing etc., so that the force which must be applied to the element in order to overcome the frictional force can be unpredictable.

It is known from U.S. Pat. No. 5,787,924 to provide, in a valve having a mechanically journaled element as described above, a controller which exerts a force on the element to move it to a desired position and then exerts an additional oscillatory force of a predetermined maximum magnitude, a working amplitude, to cause sympathetic oscillation of the element about the desired position by amounts sufficiently small so as not to adversely effect the flow control operation of the valve. This continuous oscillatory motion is designed to prevent the element sticking in the journal arrangement. The working amplitude of this additional force may even be made to be dependent, in a known manner, on the magnitude of an error signal representing the known position of the element and the desired position.

However, the magnitude of the working amplitude of the additional force, or its dependency, is factory pre-set and is typically the same for all valves of a particular type. If set too low it may not overcome the frictional forces which could vary, particularly as the valve ages. If set too high then unacceptably large oscillations in the position of the element may result. A compromise magnitude or dependency must therefore be pre-set which ensures that, for all valves, the valve will operate properly under a large cross-section of conditions.

SUMMARY OF THE INVENTION

An object of the present invention is to provide a method and an electromagnetic valve operable according to the method in which the working amplitude of the additional force causing the oscillations is adapted to the operating conditions of the valve as well as to the mechanical properties of an individual valve.

In accordance with the present invention this object is achieved in a method for controlling a friction reducing maneuver of the valve element whereby variations in the magnitude of a property, such as flow or pressure of fluid flowing through the valve, which is affected by a degree of opening of the valve and so is indicative of the degree of movement of the journaled element, is monitored as the maximum amplitude of the force causing the element to perform the friction reducing maneuver is varied. The maximum amplitude of the force is then set to that determined from the monitored variations as providing the minimum variation. Thus the amplitude of the force causing the oscillations need not be pre-set but is made dependent on the prevailing conditions within the valve. This ensures that only sufficient additional force is applied to cause the element to oscillate while minimizing the adverse effects on the fluid passing through the valve.

Preferably the method includes the step of preventing movement of the journaled element in directions other than that required to establish a degree of opening of the valve. This controls a source of variation in friction and so reduces the number of occasions during the operation of the valve for which the amplitude for minimum variation needs to be determined. Indeed to may be sufficient to carry out this determination only once, for example before delivery, during the lifetime of the valve.

The aforementioned object also is achieved in accordance with the present invention in a valve, such as an electromagnetic valve, operable according to the above-described method of the present invention and so possessing the advantages associated with that method.

DESCRIPTION OF THE PREFERRED EMBODIMENTS

Figure 1:
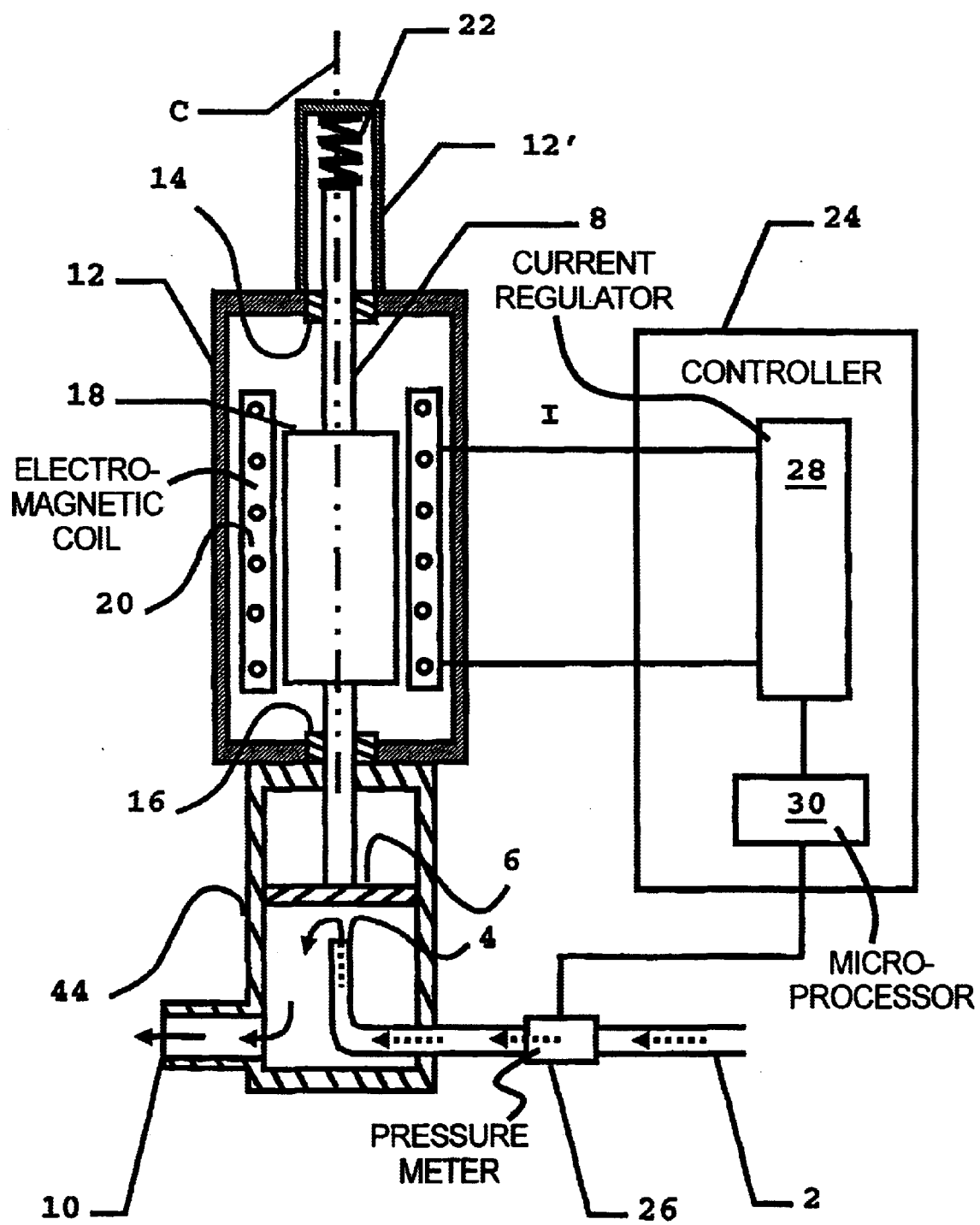
FIG. 1 is a schematic representation of an electromagnetic valve according to the present invention.

As shown in FIG. 1, an electromagnetic valve assembly has a valve 44 with an inlet 2 having an opening 4 that can be opened and closed with a membrane 6.

The membrane 6 is elastically resilient. To close the valve 44, as rod 8 pushes the membrane 6 against the opening 4. To open the valve 44, the rod 8 retracts, (upward in the FIG. 1), whereupon the membrane 6 moves resiliently away from the opening 4, to allow a flow through the inlet 2, via the opening 4, and out through an outlet 10.

The rod 8 passes through an enclosure 12 and is journaled in bearings 14 and 16 for movement in its longitudinal direction, along a control axis C. The bearings 14, 16 are made with close tolerances, since they serve as guides for the rod 8.

An anchor 18 made of magnetic material is fixed on the rod 8 and is movable inside a coil 20. In this manner the anchor 18 and accordingly the rod 8 can be moved back and forth in the rod's longitudinal direction when an appropriate current is applied to the coil 20.

The valve's degree of opening, i.e. the magnitude of the distance between the opening 4, serving as a valve seat, and the membrane 6 can therefore be adjusted by controlling a main current, I, to the coil 20.

Instead of having a separate anchor 18 arranged on the rod 8, at least a part of the rod itself can be made of a magnetic material which serves as the anchor. Alternately, the rod 8 can, at least in part, be coated with magnetic material.

For safety reasons, it may be preferable to have the rod 8 biased by a biasing element, here by a spring 22, to press the membrane 6 towards the valve opening 4, so that the valve 44 closes as soon as the main current I to the coil 20 is shut off. The spring 22 is in the present example housed in an extension 12' of the housing 12.

Friction in the bearings 14, 16 often causes the rod 8 to "stick" in an opening position. This friction is an unpredictable factor which changes, for example, with the age of the valve assembly, the side of the rod 8 pressing against the bearing etc. It is known to superimpose a smaller, additional current, preferably a sinusoidal, square or triangular wave signal, on the main current I to cause the rod 8 to oscillate around the valve's opening position as a friction reducing maneuver. Accordingly, the membrane 6 also is oscillated around this opening position. Since the rod 8 is kept constantly in motion, sticking in the bearings 14, 16 thus is prevented.

The frequency of the superimposed signal is lower than the upper limit frequency of the valving assembly but still is high enough for any oscillations induced in the flow to be quickly filtered out in the valve tubing normally connected to the outlet 10. A suitable frequency may be between about 100 Hz and about 1000 Hz.

The membrane 6 may be appropriately compressible, so the rod 8 is able to perform an oscillating, translational movement even with the membrane 6 pressed against the valve seat 4. The membrane 6 will then be alternatingly compressed and expanded.

"Sticking" between the valve seat and the valve membrane 6, which can contribute to the valve 44 becoming "stuck" in the closed position, also can be reduced by imparting motion to the rod 8 as described above.

It will be appreciated that the valving assembly as described above represents an arrangement well known in the art.

A controller 24 is provided with a current regulator 28 which operates to control the magnitude of the main current I and the superimposed current. As described below, the magnitude of at least the latter current is, for the present example, controlled in response to a pressure signal from a pressure meter 26 that is located to monitor pressure of fluid flowing through the valve 44 (shown in FIG. 1 connected to the inlet 2). It will be appreciated that another sensor for monitoring the degree of opening of the valve 44 may substitute for or be used in addition to the pressure meter 26 and its output signal used in a manner similar to that described below with respect to the output signal of the pressure meter 26. Examples of such sensors are a flow meter, employed to monitor fluid flow through the valve 44; or a position sensor, employed to sense the position of the rod 8.

A microprocessor 30 is included within the controller 24 and is adapted to receive a signal indicative of the degree of opening of the valve 44, which in the present example is a pressure signal from the pressure meter 26. The microprocessor 30 is further adapted to provide a control signal to the current regulator 28 which acts to modify a peak amplitude $A_W$, so-called "working amplitude" of the superimposed current. The microprocessor 30 is programmed to modify this working amplitude dependent on a calculated magnitude of a temporal deviation of a monitored parameter, in this example pressure, indicative of the degree of opening of the valve. The microprocessor 30 operates, as is described in detail below, to set the working amplitude to the amplitude at which the monitored variations are minimized.

According to the present example the microprocessor 30 operates during a measurement period to provide a control signal to the current regulator 28 to change the peak amplitude of the superimposed oscillatory current from the present working amplitude $A_{WOld}$ to a new peak amplitude $A_1$. During this measurement period a number M determinations of a variance VAR(j) is made by the microprocessor 30. Each variance VAR(j) is determined for a number N (which may be different for each M) samples of the pressure signal P(i) according to:

$$VAR(j) = \left[ \frac{1}{N-1} \sum_{i=1}^{N} (P(i) - P^{DT}(i))^2 \right]_{j=1}^{M} \quad (1)$$

The signal $P^{DT}(i)$ is the pressure signal P "de-trended" in some sense. Typically a polynomial of suitable degree can be used, simplest is the mean value. In the present example a straight line is used, and an extension of that could be to use a number of lines with waypoints in between, a "train of straight lines".

The straight line used here was estimated in least square sense ($\phi 1$ is offset and $\phi 2$ is slope):

$$P^{DT}(i) = \phi_1 + \phi_2 \cdot (i - i_m) \quad (2)$$

where $$\varphi_1 = \frac{1}{N} \sum_{i=1}^{N} P(i) \quad (3)$$

$$\varphi_2 = \frac{\sum_{i=1}^{N} P(i) \cdot (i - i_m)}{\sum_{i=1}^{N} (i - i_m)^2} \quad (4)$$

$$i_m = \frac{1}{N} \sum_{i=1}^{N} i \quad (5)$$

P can be any measured signal that can be said to represent the degree of opening the valve, for example flow or shaft position. A mean variance, MEAN_VAR, for the M determinations that were made over the measurement period may be calculated as:

$$\text{MEAN\_VAR} = \frac{1}{M} \sum_{j=1}^{M} VAR(j) \quad (6)$$

Where VAR(j) can be determined for each new incoming sample of P(i), that is the sample widow is moved by one sample for each of the M measurements. Alternatively, VAR(j) is determined for every N samples of P, thereby reducing the determinations by a factor of 1/N.

The above is repeated for a number, x, of other measurement periods, during each of which the microprocessor 30 provides a different peak amplitude $A_x$ of the superimposed oscillatory current to the current regulator 28. A corresponding MEAN_VAR, calculated according to the equations (1)–(6) above, is stored in a memory of the microprocessor 30 which is programmed to then determine the peak amplitude $A_x$ at which the MEAN_VAR value is minimized and then to supply this to the current regulator 28 as a new working amplitude, $A_{WNew}$ where it is used to regulate the friction reducing oscillation maneuvers of the rod 8.

Figure 2:
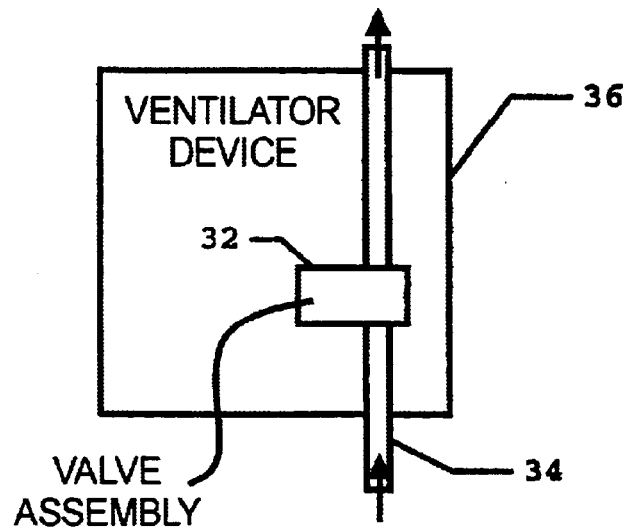
FIG. 2 is a block diagram of a portion of a patient ventilator system including a valve according to the present invention.

An example of the use of the valve of FIG. 1 is shown in FIG. 2 which depicts a functional block diagram of a portion of a patient ventilator system that is operated to control the flow of a breathing gas to and from a patient. The valve assembly of FIG. 1 is shown as a unit 32 connected in series to an expiration line 34, inside a ventilator device 36. Gas flows from a patient during expiration through the line 34 in a direction indicated by the arrows and, as is common, is vented from the ventilator device 36 either to atmosphere or to a gas recovery system (not shown). In the present example the valve unit 32 acts, in manner well known in the art, as a PEEP valve to control the flow of expiration gas through the expiration line 34 (connected to inlet 2 of the valve of FIG. 1) during an expiration phase of a patient breathing cycle and thereby to regulate the pressure within the airways of a patient (not shown) to establish predetermined PEEP level.

At the onset of an expiration phase during which a measurement period will be provided, the VAR calculation is disabled for an interval. This interval can be of a specific length in time or be determined by logic of some kind, looking at the signal level of P, for example terminating when the pressure sampled by the meter 26 of FIG. 1 falls below a pre-set level, such as the PEEP level. After this interval the microprocessor 30 of the valve unit 32 (which may alternatively be realized in program coding of a microprocessor control system (not shown) of the ventilator unit 36) operates as described above to change the peak amplitude of oscillation from the present working amplitude $A_{WOld}$ to the new amplitude $A_1$, at which it remains during the measurement period, typically for the remainder of the expiration phase. The microprocessor 30 is programmed to then calculate the value MEAN_VAR as described above. This value MEAN_VAR represents the variance for one single breath. The calculation of MEAN_VAR is then repeated for a number of other breaths, each using oscillations of a different peak amplitude, $A_x$. From each of these calculated values of MEAN_VAR and a knowledge of the associated peak amplitude $A_x$ the microprocessor is programmed, using standard algorithms, to determine a value of $A_x$ at which the variance, MEAN_VAR, will be minimized and to provide this value $A_x$ to the current regulator 28 for use as a new working amplitude $A_{WNew}$ for the friction reducing oscillations. Such a determination may be simply made, for example, by comparing all calculated values MEAN_VAR and selecting the peak amplitude $A_x$ associated with the MEAN_VAR having the smallest value as the new working amplitude $A_{WNew}$.

Thus an optimum working amplitude, $A_{WNew}$, for the valve 44 of the unit 32 can be determined in use without disrupting the provision of ventilatory support by the ventilator unit 36.

To provide a more accurate measure, a value MEAN_VAR_BREATHS, may be calculated as an average of several breaths with the same oscillation amplitude $A_x$ as:

$$\text{MEAN\_VAR\_BREATHS} = \frac{1}{NrOfBreaths} \sum_{k=1}^{NrOfBreaths} \text{mean\_var}(k) \quad (7)$$

Figure 3:
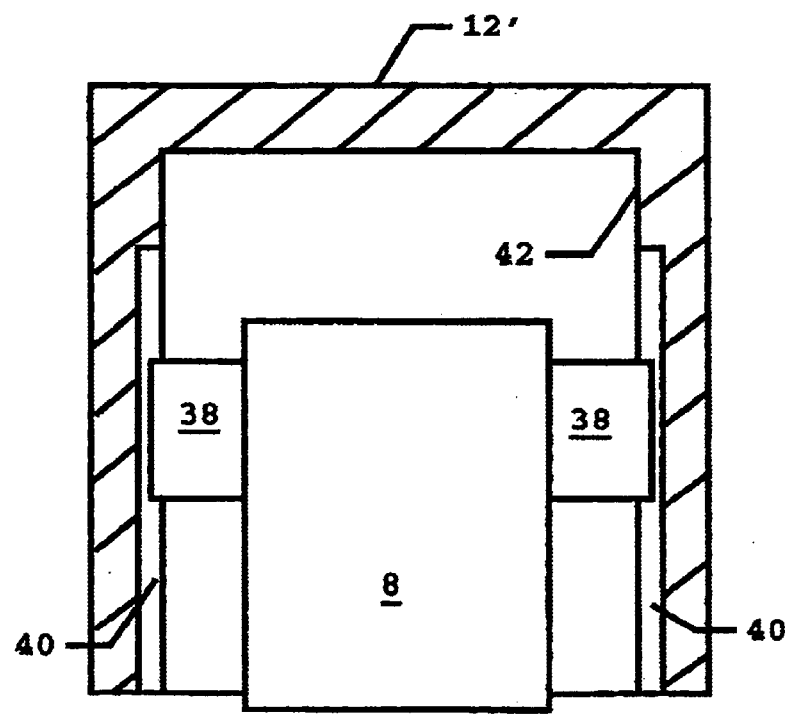
FIG. 3 illustrates a modification to the exemplary valve of FIG. 1

It was discovered that the degree of friction experienced by the rod 8 changed appreciably if the rod 8 was rotated in the bearings 14, 16 in which it was journaled. To minimize this the valve assembly according to the present invention may be modified to inhibit rotation of the rod 8. An exemplary modification of the valve assembly according to FIG. 1 to prevent rotation is illustrated in FIG. 3. In FIG. 3 the extension 12' to the enclosure 12 is shown with the spring bias element 22 removed for clarity. The section of the rod 8 that passes into the extension 12', through the bearing 14, is modified by providing extensions or "wings" 38 that slidably locate in complementary grooves 40 in the internal wall 42 of the extension 12'.

Other types of valve bodies, directly positioned by an electromagnet, can be used as well as other means for limiting the degrees of freedom of the movable element 8 to essentially that required to vary the degree of opening of the valve.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for adapting a friction-reducing maneuver in a valve assembly having an element movable in a journal arrangement to establish a degree of opening of a valve, comprising the steps of:

separately applying a plurality of different oscillatory forces, each having a different peak amplitude, to said element in said journal arrangement to produce oscillatory movement of said element in said journal arrangement to vary the degree of opening of the valve in response to each of said oscillatory forces;

in a plurality of separate measurement periods, respectively during the applications of said plurality of separately-applied oscillatory forces, monitoring temporal variations of a parameter indicative of said degree of opening of said valve;

from said temporal variations from said plurality of measurement periods, determining a working amplitude, as a peak amplitude for said oscillatory force, which minimizes said temporal variations; and setting said peak amplitude of said oscillatory force to said working amplitude.

2. A method as claimed in claim 1 wherein the step of determining said working amplitude comprises:

for each of said temporal variations respectively from said plurality of measurement periods, calculating a variance value, and thereby obtaining a plurality of variance values;

determining a minimum variance value in said plurality of variance values; and setting said working amplitude to the peak amplitude of the oscillatory force in the measurement period having said minimum variance value.

3. A method as claimed in claim 2 comprising, for each measurement period, calculating said variance value as a mean variance value in that measurement period.

4. A method as claimed in claim 1 wherein said valve opening has fluid flowing therethrough, and wherein the step of monitoring said temporal variations comprises monitoring temporal variations of at least one parameter selected from the group consisting of fluid flow through said valve opening, fluid pressure at said valve opening, and a position of said element relative to said valve opening.

5. A method as claimed in claim 1 comprising the additional step of journaling said element in said journal arrangement for translational movement along a control axis, and wherein the step of separately applying said plurality of oscillatory forces comprises applying each of said plurality of oscillatory forces to cause a sympathetic oscillatory translational motion of said element, and comprising the additional step of restricting movement of said element in directions other than a direction along said control axis.

6. A valve assembly comprising:

a valve having a valve opening and an element movable in a mechanical journal arrangement relative to said valve opening to establish an opening position of said valve;

a force applicator which interacts with said element to apply an oscillatory force to said element, thereby causing said element to execute a sympathetic oscillatory motion as a friction-reducing maneuver;

a control unit for controlling said force applicator to separately apply a plurality of different oscillatory forces to said element, each of said oscillatory forces having a different, known peak amplitude;

a monitor for detecting changes in said opening position of said valve in a plurality of measurement periods respectively during applications of said separately-applied oscillatory forces, and for providing a measurement of said changes to said control unit during each of said measurement periods; and a calculation unit connected to said control unit and to said monitor for determining, from said respective measurements, a working amplitude of said oscillatory force, as a peak amplitude which minimizes said changes, said calculation unit supplying said working amplitude to said control unit and said control unit setting said peak amplitude of said oscillatory force to said working amplitude.

7. A valve assembly as claimed in claim 6 wherein said force applicator is an electromagnetic force applicator which electromagnetically interacts with said element.

8. A valve assembly as claimed in claim 6 wherein said element is journaled in said journal arrangement for translational movement along a control axis to establish said opening position, and wherein said valve assembly further comprises a governor which inhibits movement of said element in directions other than a direction of said control axis.

9. A valve assembly as claimed in claim 8 wherein said governor inhibits rotation of said element in said journal arrangement.

* * * * *